2,754,319
Patented July 10, 1956

2,754,319

PRODUCTION OF DIESTERIFIED PHOSPHONO DERIVATIVES OF POLYFUNCTIONAL ORGANIC COMPOUNDS

Franklin Johnston, St. Albans, W. Va., assignor, by mesne assignments, to Union Carbide and Carbon Corporation, a corporation of New York No Drawing. Application July 1, 1948,
Serial No. 36,418

26 Claims. (Cl. 260—461)

This invention relates to the production of a new class of diesterified phosphono derivatives of carboxylic acid esters, amides and nitriles having at least two functional carbon atoms; and more especially it concerns products of the reaction of organic phosphite diesters with a compound selected from the class consisting of (1) the polyfunctional esters of olefine polycarboxylic acids having the double bond of at least one carbonyl carbon atom conjugated with another double bond in the molecule; (2) the corresponding amides, N-substituted amides and nitriles; and (3) the mixed ester-amide, ester-nitrile and amide-nitrile derivatives of olefine mono- and polycarboxylic acids. The term "polyfunctional" is used herein to designate esters, amides and nitriles containing at least two groups selected from the esterified carboxyl groups, the amide groups and the nitrile group.

The invention further relates to the production of plastic compositions containing the novel diesterified phosphono derivatives of such carboxylic acid esters, amides and nitriles, and mixed ester-amides, ester-nitriles and amide-nitriles, wherein such derivatives function as plasticizers for the resins forming the basis of such composition.

The invention has important utility for the production of high boiling diesterified phosphono derivatives of saturated aliphatic polycarboxylic acid esters, amides and nitriles having from two to four functional carbon atoms and having a diesterified phosphono radical connected with a carbon atom beta to at least one functional carbon atom of an esterified carboxyl, an amide or a nitrile group.

The novel compounds of the invention may be represented by the formula

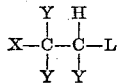

wherein X designates

wherein R represents a radical selected from the class consisting of the alkyl, aryl, aralkyl, cycloalkyl, alkenyl, alkoxyalkyl, aryloxyalkyl, cycloalkoxyalkyl and β-halogen-substituted ethyl radicals and the saturated heterocyclic radicals containing only oxygen in addition to carbon and hydrogen atoms; L designates a radical selected from the class of —COOR', —CONH₂, —CONHR, —CONR₂ and —CN radicals wherein R' designates the radicals represented by R with the exception of the aryl radicals; and each Y designates a radical selected from the class consisting of hydrogen, the aryl radicals, the alkyl radicals, and the group of radicals designated by L and by (CH₂)ₙL wherein $n$ is an integer from 1 to 5, and at least one Y is selected from the last-named group of radicals.

The new polyesters have potential utility as plasticizers for synthetic resins, and many thereof already have been shown to be efficient plasticizers for various vinyl resins. They possess flame-proofing characteristics contributing unique and desirable properties to thermoplastic resinous compositions. The new polyamides and polynitriles have potential utility as plasticizers and as starting materials for the production of other phosphorus-containing compounds.

Compounds of this new type may be produced in accordance with the invention by reacting the appropriate phosphite diesters with aliphatic, alicyclic, aralkyl, alkoxyalkyl, aryloxyalkyl, halogenated alkyl and certain heterocyclic esters of unsaturated di-, tri- and tetracarboxylic acids having a carbon to carbon double bond conjugated with the double bond of at least one carbonyl carbon atom; or with the corresponding amides, di- and tetrasubstituted amides, nitriles, and mixed ester-amides, ester-nitriles nad amide-nitriles.

The reaction preferably is conducted with dry although not necessarily anhydrous reagents, and usually in the presence of a small amount—i. e., around 0.5% to 5%— of a condensation catalyst. The best results are secured with an alkaline catalyst, among which may be mentioned the alkali metals such as metallic sodium, metallic potassium, and metallic lithium; alkali metal amides such as sodamide; alkali metal hydrides such as sodium hydride and potassium hydride; alkali metal alcoholates (alkoxides) such as sodium methylate and ethylate; sodium naphthalene; and the amines such as diethylamine and triethylamine. The alkali metal hydroxides such as sodium and potassium hydroxides are useful when dissolved in a solvent for the reactants, such as 1,2-dimethoxyethane.

Very effective catalysts are the alkali metal salts of phosphite diesters of the type

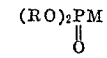

wherein M is an alkali metal atom and R has the meaning hereinafter designated. Corresponding salts of alkaline earth metals and of magnesium are less effective catalysts.

In one preferred form of the process the ester of the unsaturated carboxylic acid, or the corresponding amide or nitrile, is added in successive small increments to an agitated solution of the catalyst in the phosphite diester. The mixture usually is maintained at a reaction temperature between about 25° C. and about 125° C. However, temperatures as high as 200° C. may be employed. The addition is continued until at least one mol of the ester, amide or nitrile derivative of the unsaturated acid has been added to the solution of the phosphite diester for each mol of the latter present therein. The resultant crude reaction mixture is neutralized or slightly acidified with a suitable acid such as sulfuric, hydrochloric or phosphoric acid, or an organic acid such as acetic acid. Glacial acetic acid is preferred for this purpose. The neutralized reaction mixture then is filtered and/or washed with water; and the filtrate or washed mixture is fractionally distilled under subatmospheric pressure. The fraction containing the desired ester, amide or nitrile of the substituted-phosphono polycarboxylic acid is separately recovered.

The condensation reaction may be conducted in the presence of a volatile solvent for the reactants which is inert to the latter. The use of such a solvent is not essential; but it is desirable when the ester, amide or nitrile derivative of the unsaturated carboxylic acid used as starting material is a solid under the reaction conditions, or when such ester, amide or nitrile is a poor solvent for the phospite diester or for the catalyst. Suitable solvents include ethers such as diethyl ether, dibutyl ether, the diethers of the glycols and dioxane; and aliphatic and aromatic hydrocarbons such as n-heptane, benzene and xylene.

Among the phosphite diesters useful in the process may be mentioned the methyl, ethyl, isopropyl, butyl, hexyl, n-octyl, 2-ethylhexyl, decyl, hexadecyl, phenyl, benzyl, cyclohexyl, allyl crotonyl, β-chloroethyl, β-bromoethyl, β-methoxyethyl, β-ethoxyethyl, β-butoxyethyl, β-phenoxyethyl, tetrahydrofurfuryl and tetrahydropyranyl phosphite diesters.

The phosphite diesters may be produced by various procedures known in the art, as by reacting the appropriate alcohol with phosphorus trichloride according to the equation:

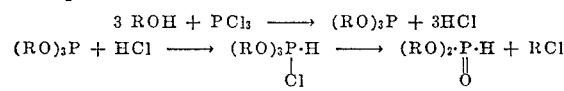

excess hydrogen chloride being removed from the reaction mixture substantially as rapidly as formed.

Esters of unsaturated polycarboxylic acids useful in the invention include those wherein the esterified carboxyl groups are attached to the same carbon atom, and those wherein such groups are attached to different carbon atoms. Among such esters are the dimethyl, diethyl, dibutyl, dihexyl, di-n-octyl, di(2-ethylhexyl), ditetradecyl, dibenzyl, di(methoxyethyl), di(ethoxyethyl), di(butoxyethyl), di(cyclohexyl), di(phenoxyethyl), di(chloroethyl), di(bromoethyl), di(tetrahydrofurfuryl), diallyl and dicrotonyl esters of the following acids: maleic acid, fumaric acid, citraconic acid, ethyl maleic acid, itaconic acid, methylene malonic acid, ethylidene malonic acid, benzylidene malonic acid and glutaconic acid; the corresponding triesters of aconitic acid and of alpha methyl aconitic acid; and the corresponding tetraesters of ethylene tetracarboxylic acid, 1 - propene-1,2,3,3-tetracarboxylic acid, and 1-butene-1,3,3,4-tetracarboxylic acid.

Among amides useful in the process may be mentioned fumaramide, maleamide, N,N,N',N'-tetramethyl maleamide, N,N,N',N'-tetrabutyl maleamide, N,N'-dimethyl fumaramide, N,N'-dibutyl fumaramide, fumardianilide, N, N,N',N'-tetrahexyl maleamide, citraconic amide, N,N'-dimethyl and N,N,N',N'-tetraethyl citraconic amides, mesaconic amide, and N,N'-dialkyl mesaconic amides. Among nitriles useful as starting materials are fumaric acid dinitrile, maleic acid dinitrile, and the corresponding dinitriles of citraconic and itaconic acids. Mixed esteramides, ester-nitriles and amide-nitriles of unsaturated compounds having two or more functional carbon atoms also are useful in the process. Examples thereof include the esters of fumaramic acid, such as the methyl, ethyl and butyl fumaramates; and similar esters of fumaramic acids substituted in the N-atom with one and those with two aliphatic or aryl groups, such as methyl N-methylfumaramate and the methyl ester of fumaranilic acid; ester-nitriles such as α,γ-dicyanoglutaconic acid ethyl ester, methyl 2-cyanoacrylate, ethyl 3-phenyl-2-cyanoacrylate, ethyl 2-cyanocrotonate, and ethyl 3-methyl-2-cyanocrotonate; and amide-nitriles such as α,γ-dicyanoglutaconic amide.

The overall reaction is illustrated by the following equation involving the reaction of dibutyl phosphite and dibutyl maleate to produce dibutyl 2(dibutylphosphono) succinate.

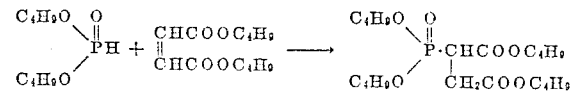

The following examples serve to illustrate the invention. In the examples, all parts are given in terms of weight, unless otherwise indicated.

EXAMPLE 1

To an agitated mixture of 194 parts (one mol) of dibutyl phosphite and 5 parts of sodamide in a flask provided with a reflux condenser were added 228 parts (one mol) of dibutyl maleate dropwise during thirty minutes while maintaining the reaction temperature at 50° C. by cooling with a water bath. Further stirring for 1.25 hours without cooling completed the reaction. The crude reaction mixture was neutralized with glacial acetic acid and filtered. The neutralized mixture was fractionally distilled under vacuum in a Claisen type still, and provided an 85% yield of dibutyl 2(dibutylphosphono)succinate as a water white oily liquid boiling at 190° C. under a pressure of 1.2 mm. of mercury, and having the properties set forth in Table 2.

Following the general reaction conditions recited in this example but substituting dibutyl fumarate for the dibutyl maleate, the identical final product, dibutyl 2-(dibutylphosphono)succinate was produced in good yield.

EXAMPLE 2

An equimolar mixture of dibutyl phosphite and dibutyl maelate was heated in a Pyrex flask at 100° C. for 137 hours. Fractional distillation of the resultant mixture under vacuum gave a low yield of crude dibutyl 2-(dibutylphosphono)succinate, which was identified by its boiling point, specific gravity and index of refraction.

EXAMPLE 3

One pound of metallic sodium was dissolved in 15 pounds of dibutyl phosphite, the mixture being cooled during the initial stages to maintain a temperature of 50° C. and afterwards heated to complete dissolution of the metal. On cooling the mixture the sodium salt of dibutyl phosphite separated from the excess dibutyl phosphite as a white waxy solid.

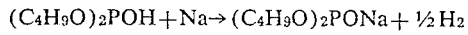

This slurry of catalyst was mixed with 53 pounds of dibutyl phosphite, and 113 pounds of di-2-ethylhexyl maleate were added over a two-hour period while maintaining the temperature at 50° C.–70 C. After heating the mixture to 80° C. for 15 minutes to complete the reaction and cooling to 40° C.–50° C., 0.26 gallon of acetic acid and 15 gallons of dibutyl ether were added and the mixture washed with 60 gallons of water. The mixture then was distilled in a stripping still to a kettle temperature of 200° C. at 4–5 mm. of mercury pressure, providing a 95.5% yield of di-2-ethylhexyl 2-(dibutylphosphono)succinate.

EXAMPLE 4

Four parts of metallic sodium were dissolved in 194 parts of dibutyl phosphite, converting a portion of the latter to the sodium salt of dibutyl phosphite. To this solution of the salt in an excess of the phosphite ester 228 parts of dibutyl maleate were added dropwise while stirring and cooling to keep the temperature below 80° C. After twenty minutes the reaction mixture was slightly acidified with acetic acid, diluted with 250 cc. of benzene, washed twice with 250 cc. of water, and filtered. The filtrate was distilled under vacuum in a pot still, yielding dibutyl 2-dibutylphosphono)succinate.

Similar results were secured when substituting lithium and potassium for the sodium under the same general conditions.

EXAMPLE 5

144 parts (0.56 mol) of diphenoxyethyl maleate in 300 parts of benzene were slowly added to a mixture of 109 parts (0.56 mol) of dibutyl phosphite and 15 parts of sodamide. After 1.5 hours to permit the weakly exothermic reaction to be completed, the reaction product was acidified with glacial acetic acid and filtered. After stripping off the volatiles from the filtrate to a kettle temperature of 165° C. under a pressure of 1 mm. of mercury the residue was distilled on a falling film type still under high vacuum. The di(phenoxyethyl) 2-(dibutylphosphono)succinate was recovered as a viscous light yellow liquid boiling at 210° C. under a pressure of 0.3 mm. of mercury, and having the properties recited in Table 2.

EXAMPLE 6

205 parts (one mol) of di(β-chloroethyl)maleate dissolved in 250 parts of dioxane were added dropwise to a stirred solution of 20 parts of sodamide in 194 parts (one mol) of dibutyl phosphite. The reaction was only slightly exothermic. The crude reaction mixture was neutralized with glacial acetic acid and filtered. The filtrate was stripped in a still to a kettle temperature of 150° C. at a pressure of 2.3 mm. of mercury, and the residue was distilled on a falling film type still, yielding a quantity of di(β-chloroethyl) 2-(dibutylphosphono)-succinate as a viscous light red liquid boiling at 195° C. under a pressure of 0.4 mm. of mercury, and having the properties recited in Table 2.

EXAMPLE 7

Following the general procedure described in Example 1, 242 parts (one mol) of dibutyl itaconate were added dropwise to 194 parts (one mol) of dibutyl phosphite containing 4 parts of sodamide. After two hours' reaction time at 65° C.–80° C., the reaction mixture was neutralized with glacial acetic acid and filtered. The filtrate was fractionally distilled in a Claisen type still under vacuum, providing an 89% yield of dibutyl 2-(dibutylphosphonomethyl)succinate,

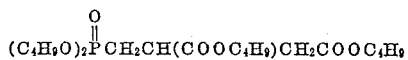

boiling at 211° C. under a pressure of 2.4 mm. of mercury, and having the other properties recited in Table 2.

EXAMPLE 8

Di(tetrahydrofurfuryl) 2-(dibutylphosphono)succinate was obtained in 57% yield by slowly adding 284 parts (one mol) of di(tetrahydrofurfuryl)maleate to 194 parts (one mol) of dibutyl phosphite containing 5 parts of sodamide over a period of thirty minutes, with cooling to maintain a temperature of 70° C.–75° C. Stirring was continued until the temperature dropped to 45° C. The reaction mixture then was neutralized with acetic acid and filtered. The distillate was stripped in a pot still to a kettle temperature of 150° C. at 2 mm. of mercury pressure, and the residue then was distilled under vacuum in a falling film type still, yielding the aforesaid succinate as a water white liquid boiling at 185° C. under a pressure of 0.5 mm. of mercury, and having the other properties recited in Table 2.

EXAMPLE 9

A solution of 63 parts (0.2 mol) of tetraethyl ethylenetetracarboxylate in 100 cc. of dibutyl ether was added slowly to a mixture of 50 parts (0.26 mol) of dibutyl phosphite and 7 parts of sodamide during 40 minutes. The reaction mixture was acidified with acetic acid, washed with water, and stripped in a pot still to a kettle temperature of 155° C. under 4 mm. of mercury pressure. The residue, tetraethyl dibutylphosphonobimalonate,

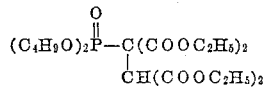

was an oily amber liquid which was compatible with a commercial vinyl chloride-acetate copolymer resin. It had a refractive index at 30° C. of 1.4480, and a specific gravity at 20° C. of 1.105, and an acidity equivalent to 0.08 cc. of N·KOH per gram.

EXAMPLE 10

196 parts of diallyl maleate were slowly added in successive portions to a stirred mixture of 194 parts of dibutyl phosphite containing 7 parts of sodamide. After the exothermic reaction was completed, the reaction mixture was neutralized with acetic acid, 250 parts of benzene were added, and the mixture was washed twice with 250 parts of water. The washed material was stripped of volatiles to a kettle temperature of 76° C. under a pressure of 2.7 mm. of mercury in a pot still, and the residue was distilled under vacuum in a falling film type still, providing a 79% yield of diallyl 2-(dibutylphosphono)-succinate, in the form of an oily water-white liquid boiling at 122° C. under a pressure of 0.35 mm. mercury, and having the other properties recited in Table 2. This ester was compatible with vinyl chloride-vinyl acetate copolymer resins having around 94% of the chloride in the polymer in an amount at least as high as 33% of the composition to give a clear, flexible sheet.

EXAMPLE 11

258 parts (one mol) of triethyl aconitate were added dropwise to 194 parts (one mol) of dibutyl phosphite containing 11 parts of sodamide. After the slightly exothermic reaction, the reaction mixture was slightly acidified with acetic acid, diluted with 300 parts of benzene, and washed twice with water. The washed liquid then was stripped in a pot still to a kettle temperature of 180° C. at 3 mm. of mercury pressure, and the residue was distilled under high vacuum in a molecular type still. The product, triethyl (dibutylphosphono)tricarballylate

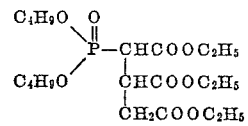

or

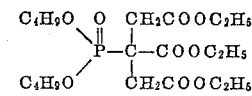

was recovered as an oily light straw colored liquid boiling at 135° C. under a pressure of one micron of mercury, and having the other properties recited in Table 2. This compound was compatible with a commercially available vinyl chloride-vinyl acetate copolymer resin at a concentration of at least 33% of the weight of the composition to yield a clear, flexible vinyl resin sheet.

Following the procedure of this example, 342 parts of tributyl aconitate were reacted with 194 parts of dibutyl phosphite. The final product, tributyl (dibutylphosphono)tricarballylate, was an oily light amber colored liquid boiling at 171° C. under a pressure of one micron of mercury in a molecular type still, and having the other properties recited in Table 2. The product was compatible with vinyl chloride-vinyl acetate copolymer resins.

EXAMPLE 12

340 parts (one mol) of di(2-ethylhexyl)maleate were added in small successive portions to a stirred mixture of 246 parts (one mol) of dicyclohexyl phosphite containing 5 parts of sodamide. After one hour's reaction with cooling to keep the temperature from rising above 80° C., the reaction mixture was neutralized with glacial acetic acid and filtered. The filtrate was stripped of volatiles by vacuum distillation to a kettle temperature of 152° C. under a pressure of 3.3 mm. of mercury. The stripped liquid then was distilled under high vacuum in a falling film type still, thereby providing a 50% yield of di(2-ethylhexyl) 2-(dicyclohexylphosphono)succinate in the form of a syrupy water-white liquid boiling at 156° C. under a pressure of one micron of mercury, and having the other properties recited in Table 2.

EXAMPLE 13

A mixture of 95 parts of diphenyl phosphite and 100 parts of dibutyl maleate was added during one hour to a suspension of 5 parts of sodamide in 88 parts of benzene. The reaction mixture was acidified with acetic acid, washed with water, distilled in vacuum to a kettle temperature of 182° C. under 2.5 mm. pressure, and the residue distilled under high vacuum, yielding dibutyl 2-(diphenylphosphono)succinate as an oily liquid boiling at 149° C. under a pressure of 5 microns of mercury, and having the other properties recited in Table 2.

EXAMPLE 14

To 300 parts of benzene containing 5 parts of sodamide slurry there was added dropwise a mixture of 99 parts (0.5 mol) of dimethoxyethyl phosphite and 115 parts (0.5 mol) of di(methoxyethyl)maleate. After the slightly exothermic reaction was complete the reaction mixture was slightly acidified with acetic acid and stripped of volatiles in a still to a kettle temperature of 156° C. under a pressure of 3.0 mm. of mercury. The still residue was distilled under vacuum in a falling film type molecular still, yielding di(methoxyethyl) 2 - dimethoxyethylphosphono)succinate

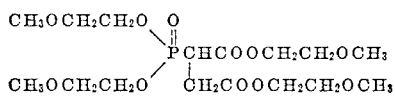

as a pale straw colored oily liquid boiling at 185° C. under a pressure of 0.7 mm. of mercury, and having the other properties recited in Table 2.

EXAMPLE 15

During one hour, 146 parts of N,N,N',N'-tetramethyl maleamide dissolved in about 1,250 parts of hot benzene were added to a mixture of 170 parts of dibutyl phosphite and 5 parts of sodamide. The mixture was agitated for two hours at 50° C.—60° C. to complete the reaction, neutralized with acetic acid, and washed three times with water. The washed mixture was stripped of benzene and was distilled in a pot still under vacuum, yielding N,N,-N',N-tetramethyl 2-(dibutylphosphono)succinamide,

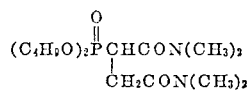

in the form of an oily yellow liquid boiling at 207° C. under a pressure of 2.1 mm. of mercury, and having other properties recited in Table 2.

EXAMPLE 16

To 262 parts of dibenzyl phosphite containing 11 parts of sodamide were added slowly with agitation 228 parts of dibutyl maleate. The crude reaction mixture from the slightly exothermic reaction was acidified with acetic acid, diluted with 350 parts of dibutyl ether, and washed with water. The washed product was stripped in a pot still to a temperature of 180° C. under a pressure of 2.8 mm. of mercury, and then was distilled in a falling film type molecular still. The product, dibutyl 2-(dibenzylphosphono) succinate, was a yellow oily liquid having the properties recited in Table 2, and was compatible with a vinyl chloride-acetate copolymer resin at 33% concentration.

EXAMPLE 17

Dibenzyl maleate (0.5 mol) was added dropwise to a mixture of dibutyl phosphite (0.5 mol) and sodamide catalyst (5 grams). When the exothermic reaction was complete, the catalyst was neutralized with acetic acid, 125 parts of dibutyl ether were added, the solution washed with water, and the washed solution was stripped in a pot still to a temperature of 203° C. at 1.5 mm. of mercury pressure, yielding dibenzyl 2-(dibutylphosphono) succinate as a still residue. Upon distillation under vacuum in a molecular type still, it had the properties recited in Table 2 and an acidity corresponding to 0.10 cc. of N·KOH per cc. It was compatible with a vinyl chloride-acetate copolymer resin at a 35% concentration to give a clear flexible film.

EXAMPLE 18

One-half mol (124 parts) of diethyl benzlidenemalonate was slowly added during 0.5 hour to a mixture of one-half mol (97 parts) of dibutyl phosphite and 5 parts of sodamide slurry. After completion of the slightly exothermic reaction the mixture was agitated for an additional 1.5 hours, was acidified with acetic acid, 225 parts of dibutyl ether were added, the mixture washed with water, and the washed liquid was stripped in a pot still to a kettle temperature of 165° C. at 4 mm. of mercury pressure. The residue was distilled in a molecular type still, yielding diethyl 2-(alpha-dibutylphosphonobenzyl) malonate in the form of a pale yellow oily liquid having the properties recited in Table 2.

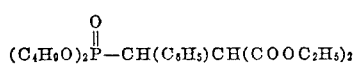

It was compatible at a concentration of 33% with a commercial grade of a vinyl chloride-acetate copolymer resin.

EXAMPLE 19

One mol (201 grams) of powdered ethyl 3-phenyl-2-cyanoacrylate was added slowly to a mixture of one mol (194 grams) of dibutyl phosphite and 16 grams of sodamide slurry, and the mixture was stirred for 2.5 hours at 50° C.–65° C. The crude product was acidified with acetic acid, washed with water, and pot distilled to a kettle temperature of 225° C. at 4.0 mm. pressure. The residue was distilled under vacuum in a molecular type still, yielding ethyl 2 - cyano - 3 - phenyl-3-dibutylphosphonopropionate,

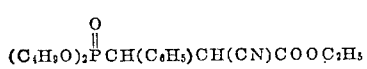

as an amber oily liquid boiling at 149° C. under a pressure of 0.05 mm. of mercury, and having a refractive index at 30° C. of 1.4870, a specific gravity at 20° C. of 1.090, and acidity equivalent to 2.295 cc. of N·KOH per gram. It was compatible with a commercial vinyl chloride-acetate copolymer resin.

EXAMPLE 20

0.67 mol of dibutyl maleate was added slowly to a solution of 0.67 mol of di-2(methyl cyclohexanemethyl)-phosphite containing 5 grams of sodamide slurry. After the slightly exothermic reaction was finished the mixture was acidified with acetic acid, diluted with dibutyl ether, washed with water, distilled under vacuum to a kettle temperature of 180° C. at 3.8 mm. pressure, and the residue distilled under high vacuum, yielding dibutyl 2-(di-2-methylcyclohexanemethylphosphono) succinate as an oily straw colored liquid boiling at 156° C. under a pressure of 6 microns and which was compatible with a commercial vinyl chloride-acetate copolymer resin at 40% concentration.

EXAMPLE 21

To a mixture of 100 parts of dibutyl phosphite and 5 parts of sodamide at about 60° C. 103 parts of ethyl 2- cyano-3-phenylcrotonate were slowly added. When the slightly exothermic reaction was completed the mixture was slightly acidified with acetic acid diluted with benzene, and the mixture was washed with water. The washed product was stripped under vacuum to a kettle temperature of 180° C. under a pressure of 1.5 mm. of mercury, and the residue was distilled under vacuum in a falling film type still, thereby providing a 34% yield of ethyl 2-cyano-3(dibutylphosphono) hydrocinnamate in the form of an oily liquid boiling at 169° C. under a pressure of 1 mm. of mercury, and having a specific gravity of 1.084 at 20° C., and a refractive index of 1.490 at 30° C. It was compatible with a commercially available vinyl chloride-acetate copolymer resin.

EXAMPLE 22

Over a period of 0.5 hour a solution of 77 grams (0.5 mol) of alpha-cyanocinnamic acid amide in 200 cc. of water ethylene glycol dimethyl ether was added to a mixture of 110 grams (0.57 mol) of dibutyl phosphite and 5 grams of sodamide slurry with agitation while maintaining the reaction mixture between 33° C. and 72° C. Upon completion of the reaction the mixture was acidified with acetic acid and cooled to room temperature when part of the product crystallized out. The mixture was filtered, and the filtrate was stripped of volatiles in a pot still to a kettle temperature of 151° C. at 2 mm. pressure, yielding a thick oily residue which crystallized on standing. This residue and the solid obtained from the aforesaid filtration totaled 173 grams of crude 2-cyano-3-dibutylphosphono-3-phenylpropionamide,

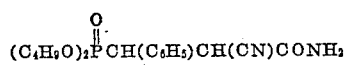

This crude material was recrystallized twice from dibutyl ether and once from ethanol-water mixture, yielding a purified product melting at 105° C.–106° C.

EXAMPLE 23

A solution of 14 grams of crude fumaric dinitrile in 125 cc. of ethylene glycol dimethyl ether was added to an agitated solution of 50 grams (0.258 mol) of dibutyl phosphite and 5 grams of sodamide slurry in 50 cc. of dibutyl ether. The solution was stirred for two hours; and the reaction mixture then was acidified with acetic acid and washed with 400 cc. of water. The washed product was distilled under vacuum, providing a quantity of dibutylphosphonosuccinonitrile,

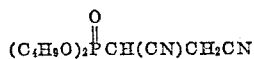

as a yellow oily liquid boiling at 170° C. under 3 mm. of mercury pressure, and having a refractive index of 1.4330 at 30° C.

EXAMPLE 24

Over a 15-minute period a solution of 40 grams of diethyl dicyanomaleate in 125 cc. of ethylene glycol dimethyl ether was added to a stirred solution of 49 grams (0.24 mol) of dibutyl phosphite and 5 grams of sodamide slurry in 50 cc. of dibutyl ether, while maintaining the temperature at 60° C. Upon completion of the reaction the mixture was acidified with acetic acid and stripped in a pot type still to a kettle temperature of 104° C. under 4 mm. of mercury pressure. The oily liquid residue (84 grams), contained the product, diethyl 2,3-dicyano-2-dibutylphosphonosuccinate,

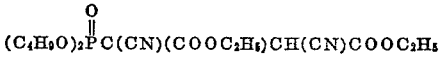

and a little unreacted dibutyl phosphite.

The "sodamide slurry" used in certain examples was a suspension of sodamide in an aliphatic hydrocarbon.

The respective runs recited in Table 1, involving the reaction of 194 parts of dibutyl phosphite and 228 parts of dibutyl maleate, were conducted in the same general manner, with the differences indicated, the catalysts being either in solution or in suspension in the dibutyl phosphite. The more strongly alkaline compounds are the more active catalysts for the process.

Table 1.—*Production of dibutyl dibutylphosphonosuccinate*

CATALYST COMPARISON

| Catalyst | Amt. of Catalyst, Grams | Treatment after DBM Addition | Yield, percent |
|---|---|---|---|
| Sodium | 4.0 | Stirred and cooled 0.5 hr. | 77.5 |
| Potassium | 4.0 | Stirred and cooled 1.0 hr. | 84.2 |
| Lithium | 4.0 | Stirred 1.75 hrs. | 50.5 |
| Sodium hydride | 4.0 | Stirred 0.75 hr. | 76.3 |
| Diethylamine | 40 cc. | Heated to 75° C. for 1.25 hrs. | 68.7 |
| Sodium napthalene | [2] 200 | Cooled 1 hour | 65.6 |
| Sodium methylate | 6.4 | Heated to 75° C. for 2.5 hrs. | 54.3 |
| Calcium oxide | 14 | Heated to 75° C. for 2 hrs. | 11.1 |
| Aluminum isopropoxide | 5 | do | 38.2 |
| Sulfuric acid [1] | 8 cc. | do | None |

[1] For comparison.
[2] Formed by reacting 5 grams sodium and 28 grams of naphthalene in 200 cc. of tetrahydrofuran.

Table 2 recites important properties of a number of the novel compounds made in accordance with the invention.

Table 2.—*Properties of typical diesterified phosphono compounds*

| Name | Ref. Index, $n_D$ at ° C. | Specific Gravity 20° C. | Boiling Point | |
|---|---|---|---|---|
| | | | ° C. | Pressure, mm. Hg |
| diethyl 2(diethylphosphono)succinate | 1.4398 | 20 | 1.1332 | 155 | 2.5. |
| diethyl 2(dibutylphosphono) succinate | 1.4412 | 20.5 | 1.0698 | 172 | 1.7 |
| dibutyl 2(diallyl-phosphono)succinate | 1.4680 | 20 | 1.0954 | 185 | 0.7. |
| diallyl 2(dibutylphosphono)succinate | 1.4568 | 20 | 1.0755 | 122 | 0.35. |
| dibutyl 2(dibutylphosphono)succinate | 1.4440 | 20 | 1.0309 | 190 | 1.2. |
| dimethoxyethyl 2(dimethoxyethylphosphono)succinate | 1.4550 | 20 | 1.1990 | 185 | 0.7. |
| di(β-chloroethyl) 2-(dibutylphosphono)succinate | 1.4718 | 20 | | 195 | 0.4. |
| dibutyl 2-(dibutylphosphonomethyl)succinate | 1.4465 | 20 | 1.0267 | 211 | 2.4. |
| triethyl (dibutylphosphono)tricarballylate | 1.4488 | 20 | 1.0953 | 135 | 1 (micron). |
| dibutyl 2(dicyclohexylphosphono)succinate | 1.4707 | 20 | 1.0745 | 168 | 0.2. |
| dicyclohexyl 2(dibutylphosphono)succinate | 1.4665 | 30 | 1.0724 | 145 | 10 microns). |
| dibutyl 2(ditetrahydrofurfurylphosphono)succinate | 1.4677 | 20 | 1.1350 | 156 | 1 (micron). |
| ditetrahydrofurfuryl 2(dibutylphosphono)succinate | 1.4682 | 20 | 1.1338 | 185 | 0.5. |
| di-2-ethylhexyl 2(diethylphosphono)succinate | 1.4500 | 20 | 1.0097 | 156 | 1 (micron). |
| dibutyl 2(di-2-ethylhexylphosphono)succinate | 1.4511 | 20 | 0.9849 | 170 | 0.2. |
| dibutyl 2(di-n-octylphosphono)succinate | 1.4498 | 20 | 0.9812 | 195 | 0.6. |

Table 2.—Properties of typical diesterified phosphono compounds.—Continued

| Name | Ref. Index, nD at °C. | Specific Gravity 20° C. | Boiling Point °C. | Pressure, mm. Hg |
|---|---|---|---|---|
| di-2-ethylhexyl 2(dibutylphosphono)succinate. | 1.4512 | 20 0.987 | 185 | 0.3. |
| tributyl (dibutylphosphono)tricarballylate. | 1.4500 | 20 1.0420 | 171 | 1 (micron). |
| di(2-ethylhexyl) 2(dimethoxyethylphosphono)succinate. | 1.4538 | 20 1.0405 | 156 | 5 (microns). |
| diphenoxyethyl 2(dibutylphosphono)succinate. | 1.4989 | 30 ¹1.2220 | 210 | 0.3. |
| di-2-ethylhexyl 2(dicyclohexylphosphono)succinate. | 1.4708 | 20 1.025 | 156 | 1 (micron). |
| dibenzyl 2(dibutylphosphono)succinate. | 1.5032 | 30 1.122 | 156 | 13 (microns). |
| dibutyl 2(dibenzylphosphono)succinate. | 1.4827 | 30 1.040 | 145 | 10 (microns). |
| N,N,N',N'-tetramethyl 2(dibutylphosphono)succinamide. | 1.4717 | 30 1.079 | 207 | 2.1. |
| N,N,N',N'-tetrabutyl 2(dibutylphosphono)succinamide. | 1.4662 | 30 0.980 | 156 | 4 (microns). |
| tridiethyl 2(diethylphosphono)succinate. | 1.4385 | 30 1.184 | 150 | 1.7. |
| dibutyl 2(diethylphosphono)succinate. | 1.4402 | 30 1.068 | 184–6 | 2.7. |
| di(methoxyethyl) 2(diethylphosphono)succinate. | 1.4456 | 30 1.165 | 200 | 2.2. |
| di(methoxyethyl) 2(diethoxyethylphosphono)succinate. | 1.4507 | 30 1.159 | 145–156 | 1 (micron). |
| dibutyl 2(diethoxyethylphosphono) succinate. | 1.4451 | 30 1.077 | 145 | 1 (micron). |
| diethyl 2(alpha-dibutylphosphonobenzyl)malonate. | 1.4800 | 30 1.0872 | 149 | 9 (microns). |
| di(2-methylcyclohexanemethyl)dibutyl-phosphonosuccinate. | 1.4681 | 30 1.046 | 156 | 2 (microns). |
| dibutyl 2-di(2-methylcyclohexanemethyl)-phosphonosuccinate. | 1.4692 | 30 1.045 | 156 | 6 (microns). |
| dibutyl2(diphenylphosphono)succinate. | 1.5043 | 30 1.135 | 149 | 5 (microns). |
| di-3-methoxybutyl 2(dibutylphosphono)succinate. | 1.4462 | 30 1.060 | 156 | 2 (microns) |
| ethyl 2-cyano-3-phenyl-3(dibutylphosphono)propionate. | 1.4870 | 30 1.090 | 149 | 0.05. |
| dibutyl diisopropylphosphonosuccinate. | 1.4373 | 30 1.0376 | 182 | 2.3. |
| di-(2-methylcyclohexylmethyl) 2(dibutylphosphono) succinate. | 1.4681 | 30 1.046 | 156 | 2 (microns). |
| di(diisobutylmethyl) 2(dibutylphosphono)succinate. | 1.4437 | 30 0.9637 | 145 | 8 (microns). |

¹ d 30°/20°.

Many of the novel products of the invention are clear, viscous liquids which are suitable as plasticizers and modifying agents for a number of commercially available resins and plastics, and particularly for vinyl resins formed by the polymerization of at least one vinyl compound including a vinyl halide, such as the polyvinyl chlorides and the copolymers of vinyl chloride and vinyl acetate. They impart flame-proofing characteristics to plastic compositions containing them.

Table 3 illustrates the attractive combination of mechanical properties and low temperature flexibility imparted to a representative commercially available resinous copolymer of vinyl chloride and vinyl acetate containing 95% of the chloride in the polymer and having an average molecular weight above 25,000, by incorporating therein around 35% or more of certain representative products of the invention. The table also indicates the resistance offered by the products to extraction thereof from the resins by oil and by water. For comparison, similar data are presented for a similar resin containing a like amount of dioctyl phthalate, a widely used plasticizer for such resin.

Table 3

| | Physical Properties of the said Vinyl Resin Containing the Plasticizer | | | | |
|---|---|---|---|---|---|
| | Effectiveness, Percent of Plasticizer in the Composition | ASTM Stiffness Modulus, p. s. i. | $T_F$, °C. | Percent Extraction | |
| | | | | Oil² | H₂O² |
| dibutyl 2 (dibutyl-phosphono) succinate | 34.9 | 580 | −25.7 | 12.3 | 0.9 |
| dibutyl 2 (dicyclohexyl-phosphono)-succinate | 40.5 | 545 | −14.2 | 3.0 | 0.9 |
| dicyclohexyl (2 (dibutyl-phosphono) succinate. | 42.0 | 580 | −8.0 | 2.5 | 0.6 |
| di (2-ethylhexyl) 2 (dicyclohexyl-phosphono)-succinate | 42.0 | 500 | −19.5 | 8.3 | 0.9 |
| di (2-ethylhexyl) 2 (di-butylphosphono) succinate | 38.6 | 700 | −36.7 | 18.2 | 0.2 |
| dioctyl phthalate¹ | 36.5 | 745 | −32.0 | 18.7 | 0.2 |
| A commercially available resinous plasticizer¹ | 45 | 600 | −8.0 | 4.4 | 1.1 |

¹ For comparison.
² At 25° C.

In mechanical properties, low temperature flexibility, and resistance to extraction by oil and by water at 25° C., the aforesaid vinyl resin stocks containing as plasticizer these products of the invention are essentially the equivalent of similar stocks containing dioctyl phthalate.

The dibutyl 2-dicyclohexylphosphonosuccinate offers the particular advantage as a plasticizer for vinyl chloride-vinyl acetate copolymer resins that it confers upon such resins properties imparted thereto by commercially available but difficultly processable resinous plasticizers, while possessing a processing advantage because of its greater fluidity at normal processing temperatures. The dibutyl 2(dibutylphosphono)-succinate and the di(2-ethylhexyl) 2(dibutylphosphono)succinate also appear to have excellent utility as plasticizers and for other purposes. Di-3-methoxybutyl 2-dibutylphosphonosuccinate, di-2-methylcyclohexanemethyl 2-dibutylphosphonosuccinate and dibutyl 2(di-2-methylcyclohexanemethylphosphono)succinate are compatible with a commercial vinyl chloride-acetate copolymer resin at 40% concentration.

The term "aryl" is used in the specification and claims to designate solely the aromatic univalent hydrocarbon residues, in accordance with the definition of "aryl" in Richter's Organic Chemistry, volume I, page 43 (2d edition).

I claim:

1. As new products, β-(diesterified phosphono)-substituted saturated aliphatic compounds of the class consisting of the saturated aliphatic acid esters, amides, nitriles, and ester-amides, ester-nitriles and amide-nitriles having 2 to 4 carbon-containing functional groups, said compounds having structures designated by the formula

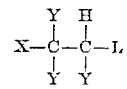

wherein X designates

wherein R represents a radical selected from the class consisting of the alkyl, aryl, aralkyl, cyclohexyl, alkenyl, alkoxyethyl, aryloxyethyl, beta-halogen substituted ethyl, tetrahydrofurfuryl and tetrahydropyranyl radicals; L designates a radical selected from the class consisting of —COOR', —CONH₂, —CONHR, —CONR₂ and —CN radicals wherein R designates a radical of the aforesaid class designated by R, and R' designates the radicals represented by R with the exception of the aryl radicals; each Y designates a radical selected from the class consisting of hydrogen, the aryl radicals, the alkyl radicals, and the group of radicals designated by L and by (CH₂)ₙL wherein n is an integer from 1 to 5, and at least one Y is selected from the last-named group of radicals.

2. As new compounds, saturated organic polyamides having from two to four amide groups and having a diesterified phosphono radical connected with a carbon atom beta to an amide carbon atom, said diesterified phosphono group being of the type

wherein each R represents a radical of the class consisting of the alkyl, aryl, aralkyl, alkenyl, cyclohexyl, alkoxyethyl, aryloxyethyl, beta-halogen-substtiuted ethyl, tetrahydrofurfuryl and tetrahydropyranyl radicals.

3. As new compounds, saturated organic nitriles having from two to four nitrile groups and having a diesterified phosphono radical connected with a carbon atom beta to a nitrile carbon atom, said diesterified-phosphono group being of the type

wherein each R represents a radical of the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

4. As new compounds, esters of saturated polycarboxylic acids having from two to four esterified carboxyl groups and having a diesterified phosphono radical connected with a carbon atom beta to the carbonyl carbon atom of an esterified carboxyl group, said diesterified-phosphono group being of the type

wherein each R represents a radical of the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

5. As new compounds, the esters of saturated tricarballylic acids having a diesterified phosphono radical connected with a carbon atom beta to the carbonyl carbon atom of an ester group, said diesterified-phosphono group being of the type

wherein each R represents a radical of the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

6. A compound having the formula

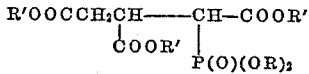

wherein R is alkyl, and R' is selected from the group consisting of the alkyl, aralkyl, alkenyl, cyclohexyl, alkoxyethyl, aryloxyethyl, beta-halogen-substituted ethyl, tetrahydrofurfuryl and tetrahydropyranyl radicals.

7. As new compounds, the esters of tetracarboxylic acids having a diesterified phosphono radical connected with a carbon atom beta to the carbonyl carbon atom of an ester group, said diesterified-phosphono group being of the type

wherein each R represents a radical of the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

8. As new compounds, the diesters of dicarboxylic acids having a diesterified phosphono radical connected with a carbon atom beta to the carbonyl carbon atom of an ester group, said diesterified-phosphono group being of the type

wherein each R represents a radical of the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

9. As a new compound, di(2-ethylhexyl) 2-(dibutylphosphono) succinate.

10. As new compounds, the diesters of succinic acid having a diesterified phosphono radical connected with a carbon atom beta to the carbonyl carbon atom of an esterified carboxyl group, said diesterified phosphono radical being of the type

wherein each R represents a radical selected from the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

11. Process for producing diesterified-phosphono derivatives of compounds of the class consisting of the saturated aliphatic carboxylic acid esters, amides, nitriles, and mixed ester-amides, ester-nitriles and amide-nitriles having from two to four carbon-containing functional groups, which comprises reacting a phosphite diester with a compound selected from the group consisting of the alpha, beta-olefinically unsaturated aliphatic carboxylic esters, amides, nitriles, and mixed ester-amides, ester-nitriles, and amide-nitriles, said compound having from two to four functional groups respectively selected from the class consisting of the ester, amide and nitrile groups, at a temperature no higher than 200° C. in the presence of an alkaline condensation catalyst.

12. Process for producing diesterified-phosphono derivatives of compounds of the class consisting of the saturated aliphatic carboxylic acid esters, amides, nitriles, and mixed ester-amides, ester-nitriles and amide-nitriles having from two to four carbon-containing functional groups, which comprises reacting a phosphite diester of the type

wherein R is a radical selected from the class consisting of the alkyl, aryl, aralkyl, alkenyl, cyclohexyl, alkoxyethyl, aryloxyethyl, beta-halogen substituted ethyl, tetrahydrofurfuryl and tetrahydropyranyl radicals, with a compound selected from the group consisting of the alpha, beta-olefinically unsaturated aliphatic carboxylic esters, nitriles, and mixed ester-amides, ester-nitriles and amide-nitriles, said compound having from two to four functional groups selected from the class consisting of the —COOR', —CONH₂, —CONHR, —CONR₂ and —CN groups wherein R designates a radical of the aforesaid class designated by R, and R' represents a radical of the class designated by R with the exception of the aryl radicals, at an elevated temperature no higher than 200° C.

13. Process for producing diesterified-phosphono derivatives of compounds of the class consisting of the saturated aliphatic carboxylic acid esters, amides, nitriles, and mixed ester-amides, ester-nitriles and amide-nitriles having from two to four carbon-containing functional groups, which comprises reacting a phosphite diester of the type

wherein R is a radical selected from the class consisting of the alkyl, aryl, aralkyl, alkenyl, cyclohexyl, alkoxyethyl, aryloxyethyl, and beta-halogen-substituted ethyl, tetrahydrofurfuryl and tetrahydropyranyl radicals, with a compound selected from the group consisting of the alpha, beta-olefinically unsaturated aliphatic carboxylic esters, amides, nitriles, and mixed ester-amides, ester-nitriles and amide-nitriles, said compound having from two to four of such functional groups selected from the class consisting of the —COOR', —CONH₂, —CONHR, —CONR₂ and —CN groups wherein R designates a radical of the aforesaid class designated by R, and R' represents a radical of the class designated by R with the exception of the aryl radicals, at a temperature no higher than 200° C., in the presence of an alkaline condensation catalyst.

14. Process as defined in claim 13, wherein the catalyst is a salt of a phosphite diester of the type

wherein M is a metal selected from the class consisting of the alkali metals, the alkaline earth metals and magnesium, and R is a radical selected from the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals.

15. Process as defined in claim 13, wherein the catalyst is an alkali metal salt of a phosphite diester.

16. Process for producing diesterified-phosphono derivatives of compounds of the class consisting of the saturated aliphatic carboxylic acid esters, amides, nitriles, and mixed ester-amides, ester-nitriles and amide-nitriles, having from two to four carbon-containing functional groups, which comprises reacting a phosphite diester of the type

wherein R is a radical selected from the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals, with a compound selected from the group consisting of the alpha, beta-olefinically unsaturated aliphatic carboxylic esters, amides, nitriles, and mixed ester-amides, ester-nitriles and amide-nitriles, said compound having from two to four functional groups selected from the class consisting of the —COOR', —CONH₂, —CONHR, —CONR₂ and —CN groups wherein R designates a radical of the aforesaid class designated by R, and R' represents a radical of the class designated by R with the exception of the aryl radicals, at a temperature of from 25° C. to 125° C. in the presence of an alkaline condensation catalyst.

17. Process for producing diesterified-phosphono derivatives of compounds of the class consisting of the saturated aliphatic carboxylic esters, amides, nitriles, and mixed ester-amides, ester-nitriles and amide-nitriles having from two to four carbon-containing functional groups, which comprises reacting a phosphite diester of the type

wherein R is a radical selected from the class consisting of the alkyl, aryl, aralkyl, cyclohexyl, alkenyl, alkoxyethyl, aryloxyethyl, beta-halogen substituted ethyl, tetrahydrofurfuryl and tetrahydropyranyl radicals, with a compound selected from the group consisting of the alpha, beta-olefinically unsaturated aliphatic carboxylic esters, amides, nitriles, and mixed ester-amides, ester-nitriles and amide-nitriles, said compound having from two to four of such functional groups selected from the class consisting of the —COOR', —CONH₂, —CONHR, —CONR₂ and —CN groups wherein R designates a radical of the aforesaid class desginated by R, and R' represents a radical of the class designated by R with the exception of the aryl radicals, at a temperature no higher than 200° C., in the presence of an alkaline condensation catalyst and of an inert solvent for the reactants.

18. Process for producing esters of saturated polycarboxylic acids having a hydrogen atom connected with a carbon atom other than a carbon atom of an esterified carboxyl group replaced by a diesterified-phosphono radical, which comprises reacting a phosphite diester of the type

wherein R is a radical selected from the class consisting of the alkyl, aryl, aralkyl, cyclohexyl, alkenyl, alkoxyethyl, aryloxyethyl, beta-halogen substituted ethyl, tetrahydrofurfuryl and tetrahydropyranyl radicals, with an ester of an unsaturated olefinic polycarboxylic acid having from two to four esterified carboxyl groups, the double bond of at least one carbonyl carbon atom being conjugated with another double bond in the molecule, in the presence of an alkaline condensation catalyst at temperatures within the range between 25° C. and 125° C.

19. Process for producing polyesters of diesterified-phosphono polycarboxylic acids having from 2 to 4 esterified carboxyl groups, which comprises adding to a mixture of a phosphite diester and an alkaline condensation catalyst successive portions of an ester of an olefinically unsaturated polycarboxylic acid having from two to four esterified carboxyl groups and having the double bond of at least one carbonyl carbon atom conjugated with another carbon to carbon double bond in the molecule, said phosphite diester being of the type

wherein R is a radical selected from the class consisting of the alkyl, aryl, aralkyl, cyclohexyl, alkenyl, alkoxyethyl, aryloxyethyl, beta-halogen substituted ethyl, tetrahydrofurfuryl and tetrahydropyranyl radicals, while maintaining the mixture at an elevated temperature not substantially higher than 200° C., and recovering from the resultant reaction mixture the polyester of the diesterified-phosphono polycarboxylic acid thus produced.

20. Process for producing polyesters of diesterified-phosphono polycarboxylic acids having from 2 to 4 esterified carboxyl groups, which comprises adding to a mixture of a phosphite diester and an alkaline condensation catalyst in solution in an inert volatile solvent for the reactants, successive small portions of an ester of an olefinically unsaturated polycarboxylic acid having from two to four esterified carboxyl groups and having the double bond of at least one carbonyl carbon atom conjugated with another carbon to carbon double bond in the molecule, said phosphite diester being of the type

wherein R is a radical selected from the class consisting of the alkyl, aryl, aralkyl, cyclohexyl, alkenyl, alkoxyethyl, aryloxyethyl, beta-halogen substituted ethyl, tetrahydrofurfuryl and tetrahydropyranyl radicals, while maintaining the mixture at an elevated temperature not substantially higher than 200° C., neutralizing the reaction mixture, removing the volatile solvent and excess reactants, and recovering from the residue the polyester of the diesterified-phosphono polycarboxylic acid present therein.

21. Process for producing polyesters of diesterified-phosphono polycarboxylic acids having two to four esterified carboxyl groups, which comprises introducing successive small portions of a mixture of a phosphite diester and an ester of an unsaturated olefinic polycarboxylic acid into an inert solvent for said phosphite diester and said unsaturated acid ester and containing an alkaline condensation catalyst, while maintaining the mixture at an elevated temperature no higher than 200° C., said phosphite diester being of the type

wherein R is a radical selected from the class consisting of the alkyl, aryl, aralkyl, cyclohexyl, alkenyl, alkoxyethyl, aryloxyethyl, beta-halogen substituted ethyl, tetrahydrofurfuryl and tetrahydropyranyl radicals, and said unsaturated polycarboxylic acid ester having from two to four esterified carboxyl groups and the double bond of at least one carbonyl carbon atom being conjugated with another carbon to carbon double bond in the molecule, and recovering from the resultant reaction mixture the polyester of the diesterified-phosphono polycarboxylic acid thus produced.

22. The process of effecting an addition reaction of a dialkyl phosphite with an aliphatic diester of an ethylene alpha, beta dicarboxylic acid in the presence of an alkali metal as a catalyst to obtain an aliphatic diester of an alpha-(dialkyl phosphone) aliphatic saturated dicarboxylic acid.

23. Process which comprises effecting an addition reaction of a dialkyl phosphite with an aliphatic diester of an ethylene alpha, beta-dicarboxylic acid, in the presence of an alkaline catalyst, thereby producing an aliphatic diester of an aliphatic saturated dicarboxylic acid having a dialkylphosphono group connected to a carbon atom beta to the carbonyl carbon atom of an esterified carboxyl group.

24. Process which comprises reacting a dialkyl phosphite with an olefinic ester having the formula

R′OOCCH=CHCOOR′ wherein R′ is a radical selected from the class consisting of the alkyl, aralkyl, alkenyl, cyclohexyl, alkoxyethyl, aryloxyethyl, beta-halogen-substituted ethyl, tetrahydrofurfuryl and tetrahydropyranyl radicals, in the presence of an alkaline catalyst, and recovering from the resultant reaction mixture an adduct having the structure

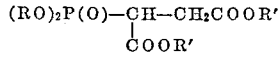

wherein R is an alkyl radical.

25. Process which comprises effecting an addition reaction of (1) phosphite diester of the formula $(RO)_2P(O)H$, wherein R is selected from the class consisting of the alkyl, aryl, aralkyl, alkenyl, cyclohexyl, alkoxyethyl, aryloxyethyl, beta-halgoen-substituted ethyl, tetrahydrofurfuryl and tetrahydropyranyl radicals, with (2) an aliphatic diester of an ethylene alpha, beta-dicarboxylic acid, in the presence of an alkaline catalyst, thereby producing an aliphatic diester of an aliphatic saturated dicarboxylic acid having a $(RO)_2P(O)$-group connected to a carbon atom beta to the carbonyl carbon atom of an esterified carboxyl group.

26. Process which comprises effecting an addition reaction of (1) a phosphite diester of the formula $(RO)_2P(O)H$, wherein R is selected from the class consisting of the alkyl, aryl, aralkyl, alkenyl, cyclohexyl, alkoxyethyl, aryloxyethyl, beta-halogen-substituted ethyl, tetrahydrofurfuryl and tetrahydropyranyl radicals, with (2) an aliphatic ethylene alpha, beta-dinitrile, in the presence of an alkaline catalyst, thereby producing an aliphatic saturated dinitrile having a $(RO)_2P(O)$-group connected to a carbon atom beta to a —CN group.

References Cited in the file of this patent

UNITED STATES PATENTS

| | | |
|---|---|---|
| 2,137,792 | Woodstock | Nov. 22, 1938 |
| 2,268,158 | Marvel | Dec. 30, 1941 |
| 2,385,879 | Patton | Oct. 2, 1945 |
| 2,409,344 | Davis | Oct. 15, 1946 |
| 2,439,214 | Lindsey | Apr. 6, 1948 |
| 2,440,800 | Hanford | May 4, 1948 |
| 2,478,390 | Hanford | Aug. 19, 1949 |

OTHER REFERENCES

Kosolapoff: J. Am. Chem. Soc., vol. 68, pp. 1103–1105 (June 1946).

Arbuzov: J. Gen. Chem. U. S. S. R. 17, pp. 2149–57, (1947). Abstract in Chemical Abstracts 42, 4524 (1948).